United States Patent [19]

Scola et al.

[11] Patent Number: 5,178,964

[45] Date of Patent: * Jan. 12, 1993

[54] FABRICATING CROSSLINKED POLYIMIDE HIGH TEMPERATURE COMPOSITES AND RESINS

[75] Inventors: Daniel A. Scola, Glastonbury; John H. Vontell, Manchester, both of Conn.

[73] Assignee: United Technologies Corporation, Hartford, Conn.

[*] Notice: The portion of the term of this patent subsequent to Apr. 14, 2009 has been disclaimed.

[21] Appl. No.: 737,104

[22] Filed: Jul. 29, 1991

Related U.S. Application Data

[63] Continuation-in-part of Ser. No. 401,211, Aug. 31, 1989, abandoned.

[51] Int. Cl.$^5$ .............................................. B32B 27/00
[52] U.S. Cl. ............................. 428/473.5; 156/307.4; 156/331.1; 427/38; 528/339; 528/347
[58] Field of Search ............... 156/307.4, 307.1, 331.1; 427/381; 428/473.5; 528/339, 347

[56] References Cited

U.S. PATENT DOCUMENTS

| | | |
|---|---|---|
| 3,925,587 | 12/1975 | Park . |
| 4,197,339 | 4/1980 | Paul et al. .................. 156/307.4 |
| 4,576,857 | 3/1986 | Gannett et al. . |
| 4,579,782 | 4/1986 | Kumar et al. . |
| 4,600,769 | 7/1986 | Kumar et al. . |
| 4,765,942 | 8/1988 | Christensen et al. . |
| 4,769,197 | 9/1988 | Kromrey . |
| 4,877,653 | 10/1989 | Vora et al. . |
| 4,898,754 | 2/1990 | Christensen et al. ............ 428/473.5 |
| 5,104,474 | 4/1992 | Scola et al. ..................... 156/307.1 |

OTHER PUBLICATIONS

"Processing of PMR-15 Prepregs for High Temperature Composites," by Mel Kantz, published in Plastics Engineering, vol. 46, No. 1, Jan. 1990, at pp. 27–30.

*Primary Examiner*—John J. Gallagher
*Attorney, Agent, or Firm*—George J. Romanik

[57] ABSTRACT

A polyimide resin or composite may be pretreated by heating a reaction mixture that initially includes an aromatic diamine monomer, an end cap monomer, and an aromatic dianhydride monomer to a temperature between about 250° C. and about 300° C. for a period sufficient to completely imidize the reaction mixture to an imide resin without substantial crosslinking. A crosslinked reinforced polyimide composite article may be fabricated by heating a plurality of prepregs to a first temperature between about 250° C. and about 300° C. for a first period sufficient to completely imidize the prepreg without substantial crosslinking. Each prepreg has a plurality of reinforcing fibers and a reaction mixture. The prepregs are stacked in a desired orientation to form a laminated structure before or after heating to the first temperature and further heated at a superatmospheric pressure to a second temperature for a second period to form a crosslinked reinforced polyimide composite article by consolidating the prepregs and crosslinking the imide resin in the prepreg.

18 Claims, No Drawings

FABRICATING CROSSLINKED POLYIMIDE HIGH TEMPERATURE COMPOSITES AND RESINS

This application is a continuation-in-part of U.S. application Ser. No. 07/401,211, filed on Aug. 31, 1989, now abandoned.

CROSS REFERENCE TO RELATED APPLICATIONS

This application is related to commonly assigned U.S. application Ser. No. 07/401,196, filed on Aug. 31, 1989 and entitled "Method for Fabricating Advanced Graphite Fiber Epoxy Composite."

TECHNICAL FIELD

The present invention is directed towards crosslinked polyimide high temperature composites and resins.

BACKGROUND ART

Crosslinked polyimide high temperature composites and resins are useful in the aerospace industry and other industries because they are lightweight, high strength, high temperature materials. They are made by heating a reaction mixture of polymerizable monomeric reactants (PMR) to form an oligomeric imide resin in a pretreatment step. The imide resin may be further heated to crosslink it into a thermosetting polyimide resin. If desired, the crosslinking can be done under pressure to consolidate the imide resin into a polyimide resin article of a desired shape.

The reaction mixture used to make the imide resin includes an aromatic diamine monomer, an end cap monomer, and an aromatic dianhydride monomer. The aromatic dianhydride monomer may be used as either the aromatic dianhydride, a diester-diacid of the aromatic dianhydride, or a tetra acid of the aromatic dianhydride.

The pretreatment step, which forms the imide resin, generates and removes volatile gases that would otherwise form internal voids and surface blisters in the finished articles. Voids and blisters are undesirable because they detract from the physical properties and thermooxidative stability of the consolidated polyimide materials. Some references, including U.S. Pat. No. 4,197,339 to Paul et al., teach that up to about 10 volume percent (vol. %) voids in the final product are acceptable.

A conventional pretreatment step includes heating a reaction mixture from room temperature to about 204° C. (400° F.). For example, the reaction mixture may first be heated to 93° C. (200° F.) for one hour, then heated to 149° C. (300° F.) for another hour, and finally heated to 204° C. (400° F.) for two additional hours. Heating the reaction mixture to these temperatures provides energy to activate imidization reactions that generate most of the volatiles without activating crosslinking reactions. Substantial crosslinking during pretreatment is undesirable because crosslinked materials are more difficult to consolidate than materials that are not crosslinked. Because crosslinking can begin at temperatures higher than 204° C. (400° F.) and is likely to occur at temperatures higher than about 250° C. (482° F.), conventional pretreatments are done at temperatures no higher than 204° C. The pretreatment step is frequently done under a vacuum to facilitate removal of the volatiles. Following a conventional pretreatment, the imide resin is considered capable of consolidation and crosslinking with no further evolution of volatiles.

Experience has shown, however, that polyimide materials prepared by a conventional pretreatment method often do not consolidate properly because of additional volatiles generated during consolidation. As a result, polyimide materials made with a conventional pretreatment can have high void fractions, inadequate physical properties, poor thermooxidative stability, and may be prone to blistering. These problems could be prevented if a pretreatment method capable of removing more volatiles from the reaction mixture was available. Additionally, to eliminate the inconvenience of using a vacuum system, it would be desirable if any new pretreatment method could remove volatiles without the use of a vacuum.

Accordingly, what is needed in the industry is a method of pretreating polyimide reaction mixtures that is capable of removing more volatiles than conventional pretreatment methods without the need to use a vacuum.

DISCLOSURE OF THE INVENTION

The present invention is directed towards a method of pretreating polyimide reaction mixtures that is capable of removing more volatiles than conventional pretreatment without the need to use a vacuum.

One aspect of the includes a method for pretreating a resin or composite including a reaction mixture that initially comprises aromatic diamine monomer, an end cap and an aromatic dianhydride monomer to a temperature between about 250° C. and about 300° C. for a period sufficient to completely imidize the reaction mixture to an imide resin without substantial crosslinking. The imide resin is capable of being further processed into a crosslinked polyimide resin or composite article having less than about 2 vol. % voids.

Another aspect of the invention includes a method for fabricating a crosslinked reinforced polyimide composite article including heating a plurality of prepregs to a first temperature between about 250° C. and about 300° C. for a first period sufficient to achieve completely imidize the prepreg without substantial crosslinking. Each prepreg has a plurality of reinforcing fibers and a reaction mixture as described above. The prepregs are stacked in a desired orientation to form a laminated structure before or after heating to the first temperature and further heated at a superatmospheric pressure for a second temperature for a second period to form a crosslinked reinforced polyimide composite article by consolidating the prepregs and crosslinking the imide resin in the prepreg. The composite article has less than about 2 vol. % voids.

Another aspect of the invention includes a crosslinked reinforced polyimide composite article made according to the above method.

The foregoing and other features and advantages will become more apparent from the following description.

BEST MODE FOR CARRYING OUT THE INVENTION

The present invention applies to all crosslinked polyimide materials, including, but not limited to, fiber reinforced polyimide resin composites, particulate reinforced polyimide resin composites, and neat, that is unreinforced, polyimide resin materials. The polyimide resins used to make these materials may be formed by processing any conventional reaction mixture capable of forming crosslinked polyimide resins. The reaction mixture should be a mixture of polymerizable monomeric reactants (PMR) that includes an aromatic diamine monomer, an end cap monomer, and an aromatic dianhydride monomer.

The aromatic diamine monomer should have the following general formula:

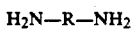

where R is a divalent aryl radical. For example, R may be:

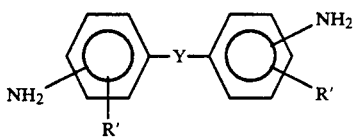

where Y is $SO_2$, O, S, SO, NH, C=O, $SiH_2$, Se, $CH_2$,

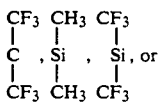

$NR_3$ and $R_3$ is an alkyl or aryl radical and R' is an alkyl or aryl radical or $CF_3$. The preferred aromatic diamine is 1,4,-phenylene diamine (PPDA), which has the following formula:

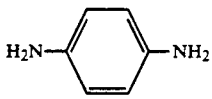

The end cap monomer may have the following general formula:

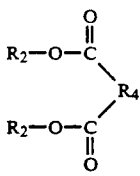

where $R_2$ is an alkyl radical or hydrogen and at least one $R_2$ is an alkyl radical and $R_4$ is a divalent radical of the formula:

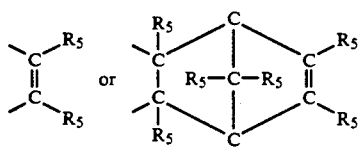

where $R_5$ is an alkyl radical or hydrogen. For example, the end cap monomer may be the monomethylester of 5-norbornene-2,3-dicarboxylic acid (NE), the monomethylester of itaconic acid (ITE), the monomethylester of 2,5-bicyclo-2.2.1)-heptadiene-2,3-dicarboxylic acid (NDE), or the monomethylester of maleic acid (MAE).

Preferably, the end cap monomer will be the monomethylester of NE as shown below:

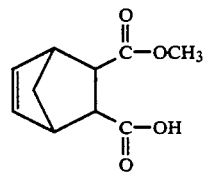

The aromatic dianhydride monomer may have the following general formula:

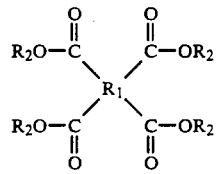

where $R_2$ is an alkyl radical or hydrogen and at least two $R_2$ z are alkyl radicals and $R_1$ is a tetravalent aryl radical. The aromatic dianhydride monomer may be used as either the aromatic dianhydride, a diester-diacid of the aromatic dianhydride, or a tetra acid of the aromatic dianhydride. For example, the aromatic dianhydride monomer may be the dimethylester of 4,4'-hexafluoroisopropylidene biphthalic acid (6FDE) or the dimethylester of 4,4'-(2,2,2-trifluoro-1-phenylethylidene) biphthalic tetracarboxylic acid (3FDE). Preferably, the aromatic dianhydride will be 6FDE, which has the following formula:

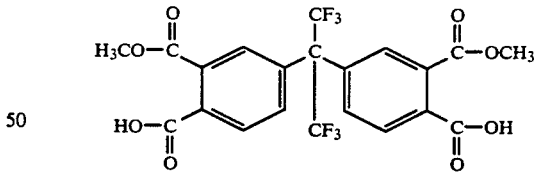

The PMR reaction mixture may be dissolved in a suitable solvent, such as methanol, ethanol, butanol, or any similar solvent. In addition to the PMRs, the reaction mixture may include various conventional processing aids. For example, N-phenylnadimide is useful as a reactive viscosity modifier.

The monomers in the PMR reaction mixture should be combined in a molar ratio that can produce a desired resin when heated. For example, a reaction mixture of NE, PPDA, and 6FDE combined in a molar ratio of (2 moles NE):(n+1 moles PPDA):(n moles 6FDE) reacts when heated to form an oligomeric imide resin having the following structure.

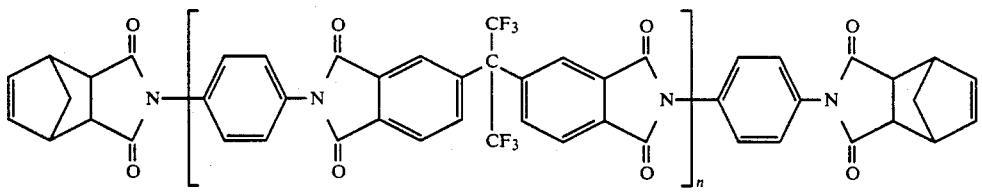

The number of repeating units, n, in the oligomer may be varied to form a homologous series of PMR resins. Each resin in the series is characterized by the average molecular weight of the corresponding oligomeric imide resin. Data for a typical series of homologous PMR resins are given in Table 1.

TABLE 1

| Molar Ratio NE:PPDA:6FDE | Average Oligomer Molecular Weight | Resin Designation |
| --- | --- | --- |
| 2:2.161:1.161 | 1000 | PMR-II 10 |
| 2:2.684:1.684 | 1270 | PMR-II 12.7 |
| 2:2.742:1.742 | 1300 | PMR-II 13 |
| 2:3.129:2.129 | 1500 | PMR-II 15 |
| 2:4.097:3.097 | 2000 | PMR-II 20 |
| 2:5.996:4.996 | 2980 | PMR-II 29.8 |
| 2:6.034:5.034 | 3000 | PMR-II 30 |
| 2:9.908:8.903 | 5000 | PMR-II 50 |
| 2:10.005:9.00 | 5050 | PMR-II 50.5 |

The reaction mixture may be pretreated neat, that is, without reinforcement, to form a neat imide resin and, eventually, a polyimide resin. The reaction mixture may be also incorporated into a prepreg that can be pretreated to form an imide prepreg that contains an imide resin and, eventually, a reinforced polyimide resin composite. Polyimide resin composites may be reinforced with any compatible reinforcing fibers or other conventional reinforcing material, including particulates. Suitable reinforcing fibers include graphite fibers, carbon fibers, glass fibers, refractory ceramic fibers, and silicon carbide fibers. Graphite fibers are preferred for applications that require high modulus fibers. Suitable graphite fibers include CELION® 6000, G40-800, and other graphite fibers available from BASF (Parsippany, N.J.) and AS4 and IMI fibers, available from Hercules, Inc. (Wilmington, Del.). Glass fibers are preferred for applications in which lower modulus fibers are acceptable. Composite articles may include about 20 vol. % to about 70 vol. % fiber reinforcement. Preferably, the composite articles will include about 50 vol. % to about 60 vol. % fiber reinforcement.

Prepregs may be made by any conventional method. For example, fibers in the form of woven cloth, unidirectional tapes, or rovings may be impregnated with a reaction mixture solution. The solvent is then evaporated to form a prepreg. Prepregs may be laid up in a desired orientation to form a laminated structure before or after being pretreated.

The pretreatment conditions should permit the PMR reaction mixture to be completely imidized without substantial crosslinking. In this application, substantial crosslinking means more than about 5% crosslinking. Crosslinking is undesirable because it inhibits the removal of volatile materials from the reaction mixture and makes further processing of the imide material difficult. The reaction mixture, whether neat or incorporated into a prepreg, may be pretreated by heating it to a temperature between about 204° C. (400° F.) and about 300° C. (572° F.). Preferably, pretreatment will be done under atmospheric pressure, although a vacuum may be used to further promote the removal of volatiles. The preferred pretreating temperature is between about 250° C. (482° F.) and about 300° C. (572° F.). Most preferably, the reaction mixture will be pretreated between about 250° C. (482° F.) and about 275° C. (527° F.). The reaction mixture should be held at the pretreatment temperature for a period sufficient to completely imidize the monomers in the reaction mixture. The pretreatment, however, should be short enough to prevent substantial crosslinking from occurring. A pretreatment of about 30 minutes (min) to about 120 min may be satisfactory. Preferably, the pretreatment will last about 30 min to about 60 min. If the reaction mixture is pretreated at temperatures above 275° C. (527° F.), the time above 275° C. should be limited to no more than about 30 min.

The temperature range chosen for pretreatment is critical. At temperatures above the upper temperature limit, crosslinking occurs too rapidly to permit removal of volatiles and still produce a substantially noncrosslinked material. Although 275° C. (527° F.) has been thought to be the maximum pretreatment temperature up to now, experience with the present invention has shown that temperatures of up to about 300° C. (572° F.) can be tolerated for short periods. Below 204° C. (400° F.), the viscosity of the reaction mixture may be too high for volatiles to be removed within a reasonable time.

Following pretreatment, the imide prepreg or imide resin may be further processed by any conventional method, including autoclave molding, thermoclave molding, or compression molding, to consolidate it and crosslink it into a usable article. Ordinarily, consolidation and crosslinking follow pretreatment as part of the same, continuous process of fabricating a polyimide article. If desired, however, the imide prepreg or imide resin may be cooled before consolidation and crosslinking. Immediately after pretreatment, an imide prepreg of the present invention is in a form analogous to a conventional "B-stage" fiber prepreg material, except that the imide prepreg is substantially free of volatile impurities and reaction products.

A suitable compression molding method may include heating the imide prepreg or imide resin to a temperature between about 290° C. (554° F.) and about 320° C. (608° F.) under superatmospheric pressure. Imide prepregs may be compression molded at pressures between about 34.5 bar (500 pounds per square inch (psi)) and about 345 bar (5000 psi). Neat imide resins may be pressed at pressures as low as about 6.9 bar (100 psi). The consolidation pressure should be maintained for about 1 hour (hr) to about 2 hr to form a crosslinked polyimide composite or resin article.

After consolidation and crosslinking, the crosslinked polyimide composite or resin article may be postcured by conventional methods. For example, the article may be heated to a temperature between about 320° C. (608° F.) and about 400° C. (752° F.) for about 8 hr to about 24 hr.

A crosslinked polyimide composite or resin article formed by the process of the present invention is substantially free of internal voids and surface blisters. Substantially free of internal voids means that the composite or resin article contains less than about 2 vol. % voids. As a result, the article will have a good surface finish, good physical properties, and good thermo-oxidative stability.

The following example is given to demonstrate the present invention. It is not intended to limit the broad scope of the present invention.

EXAMPLE

Several samples of fiber reinforced crosslinked polyimide composites were made to demonstrate the present invention. A dilute solution of a PMR-II-30 reaction mixture was made by dissolving NE, PPDA, and 6FDE in a ratio of 2 moles NE:6.034 moles PPDA:5.034 moles 6FDE in methanol. CELION ® 6000 fibers (BASF, Parsippany, N.J.) were wetted with acetone and manually brushed with the reaction mixture solution while being wound around a 38.6 cm (15.2 inch) diameter rotating drum. The fibers were permitted to air dry to form prepregs. Prepregs that were to be compression molded had a width of 11.4 cm (4.5 inch). Prepregs that were to be autoclave molded had a width of 10.2 cm (4.0 inch). The prepregs were laid up in a desired orientation to form a laminated structure and pretreated for one hour in air under atmospheric pressure at various temperatures. One batch of prepregs was pretreated at 200° C. (392° F.), another batch at 250° C. (482° F.), and a third batch at 275° C. (527° F.). Following pretreatment, the imide prepregs were compression molded following either cycle 1 or cycle 2, detailed below, to form samples of a fiber reinforced crosslinked polyimide composite.

Cycle 1—Compression Molding

1. Heat from room temperature to 250° C. (485° F.) at a rate of 8.3° C. (15° F.)/min; apply 68.9 bar (1000 psi) at 250° C.; hold for 60 min.
2. Heat to 371° C. (700° F.) at a rate of 5.5° C. (10° F.)/min; apply 68.9 bar at 371° C.; hold 60 min.
3. Postcure at 370° C. (698° F.) for 24 hours.

Cycle 2—Compression Molding

1. Heat from room temperature to 290° C. (555° F.) at a rate of 11° C. (20° F.)/min; apply 68.9 bar (1000 psi) at 290° C.; hold for 60 min.
2. Heat to 371° C. (700° F.) at a rate of 5.5° C. (10° F.)/min; apply 68.9 bar at 371° C.; hold for 120 min.
3. Postcure at 370° C. (698° F.) for 24 hours.

The samples were then sectioned perpendicular to the fiber direction and inspected by optical microscopy to determine their quality. The results of these inspections are listed in Table 2.

TABLE 2

| Pretreatment Temperature | Molding Cycle | Quality | Comments |
|---|---|---|---|
| 200° C. | 1 | poor | many voids |
| 250° C. | 1 | fair | some voids |
| 275° C. | 1 | excellent | very few voids |
| 275° C. | 2 | good | very few voids |

These data show that a pretreatment at the temperatures used by the method of the present invention, 250° C. to 275° C., more completely removes void-causing volatiles from the imide prepreg or imide resin than a pretreatment at the prior art temperature, 200° C. Moreover, the method of the present invention does not require a vacuum to remove volatiles from the reaction mixture. As a result, the higher pretreatment temperature permits substantially void free composites to be made. The data also show that materials heated to the higher pretreatment temperatures of the present invention are still capable of being formed by compression molding, despite the occurrence of a small amount (less than 5%) crosslinking.

It should be understood that the invention is not limited to the particular embodiments shown and described herein, but that various changes and modifications may be made without departing from the spirit or scope of the claimed invention.

We claim:

1. A method for fabricating a crosslinked reinforced polyimide composite article, comprising:
   (a) heating a plurality of prepregs to a first temperature between about 25° C. and about 300° C. for a first period sufficient to completely imidize the prepregs without substantial crosslinking, wherein each prepreg comprises a plurality of reinforcing fibers and a reaction mixture that initially comprises an aromatic diamine monomer, an end cap monomer, and an aromatic dianhydride monomer;
   (b) stacking the prepregs in a desired orientation to form a laminated structure;
   (c) heating the stacked prepregs at a superatmospheric pressure to a second temperature for a second period to form a crosslinked reinforced polyimide composite article by consolidating the prepregs and crosslinking the imide resins in the prepreg;
   whereby the composite article has less than about 2 vol. % voids.

2. The method of claim 1 wherein the reaction mixture comprises 1,4'-phenylene diamine, the monomethylester of 5-norbornene-2,3-dicarboxylic acid, and the dimethylester of 4,4'-hexafluoroisopropylidene biphthalic acid.

3. The method of claim 1 wherein the prepregs are heated to the first temperature at atmospheric pressure.

4. The method of claim 1 wherein the first period is between about 30 minutes and about 120 minutes.

5. The method of claim 1 wherein the second temperature is between about 290° C. and about 320° C. and the second period is between about 1 hr and about 2 hr.

6. The method of claim 1 further comprising:
   (d) heating the crosslinked reinforced polyimide composite to a temperature between about 320° C. and about 400° C. for about 8 hr to about 24 hr to form a postcured crosslinked reinforced polyimide composite article;
   whereby the composite article has less than about 2 vol. % voids.

7. The method of claim 1 wherein step (a) is performed before step (b).

8. The method of claim 1 wherein step (b) is performed before step (a).

9. The method of claim 1 wherein the first temperature is between about 275° C. and about 300° C. and the first period is about 30 min or less.

10. A crosslinked reinforced polyimide composite article made according to the method of claim 1.

11. A method for pretreating a polyimide resin or composite including heating a reaction mixture that initially comprises an aromatic diamine monomer, an end cap monomer, and an aromatic dianhydride monomer to an elevated temperature, wherein the improvement comprises:

heating the reaction mixture to a temperature between about 250° C. and about 300° C. for a period sufficient to completely imidize the reaction mixture to an imide resin without substantial crosslinking, wherein the imide resin is capable of being further processed into a crosslinked polyimide resin or composite article having less than about 2 vol. % voids.

12. The method of claim 11 wherein the aromatic diamine monomer is selected from the group consisting of 1,4'-phenylene diamine and

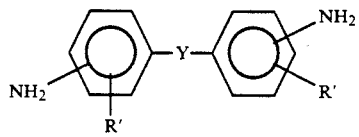

where Y is SO$_2$, O, S, SO, NH, C=O, SiH$_2$, Se, CH$_2$,

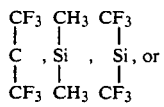

NR$_3$ and R$_3$ is an alkyl or aryl radical and R' is an alkyl or aryl radical or CF$_3$.

13. The method of claim 11 wherein the end cap monomer is selected from the group consisting of the monomethylester of 5-norbornene-2,3-dicarboxylic acid, the monomethylester of itaconic acid, the monoethylester of 2,5-bicycle (2.2.1)-heptadiene-2,3-dicarboxylic acid, and the monoethylester of maleic acid.

14. The method of claim 11 wherein the aromatic dianhydride monomer is the diethyl ester of 4,4'-hexafluoroisopropylidene biphthalic acid or the dimentylester of 4,4'-(2,2,2-trifluoro-1-phenylethylidene) biphthalic tetracarboxylic acid.

15. The method of claim 11 wherein the reaction mixture comprises 1,4'-phenylene diamine, the monomethylester of 5-norbornene-2,3-dicarboxylic acid, and the dimethyl diester of 4,4'-hexafluoroisopropylidene biphthalic acid.

16. The method of claim 11 wherein the reaction mixture is heated for about 30 minutes to about 120 minutes.

17. The method of claim 11 wherein the reaction mixture is heated at atmospheric pressure.

18. The method of claim 11 wherein the reaction mixture is heated to a temperature between about 275° C. and about 300° C. for about 30 min or less.

* * * * *

UNITED STATES PATENT AND TRADEMARK OFFICE
CERTIFICATE OF CORRECTION

PATENT NO. : 5,178,964
DATED : January 12, 1993
INVENTOR(S) : Daniel A. Scola et al It is certified that error appears in the above-identified patent and that said Letters Patent is hereby corrected as shown below:

Column 2, line 29, after "including", insert --heating--.

Column 2, line 30, after "comprises", insert --an--.

Column 2, line 31, after "cap", insert --monomer--.

Column 2, line 27, after "treatment", insert --methods--.

Column 2, line 28, after "the", insert --invention--.

Column 2, line 28, after "a", insert --polyimide--.

Claim 1, Column 8, line 24, "25°C" should be --250°C--.

Claim 14, Column 10, line 16, "diethyl" should be --dimethyl--.

Signed and Sealed this

Thirtieth Day of November, 1993

Attest:

BRUCE LEHMAN

Attesting Officer

Commissioner of Patents and Trademarks